March 14, 1961
H. G. DUNIVEN
2,974,993
OBJECT ENGAGING DEVICE
Filed Sept. 27, 1957
2 Sheets-Sheet 1
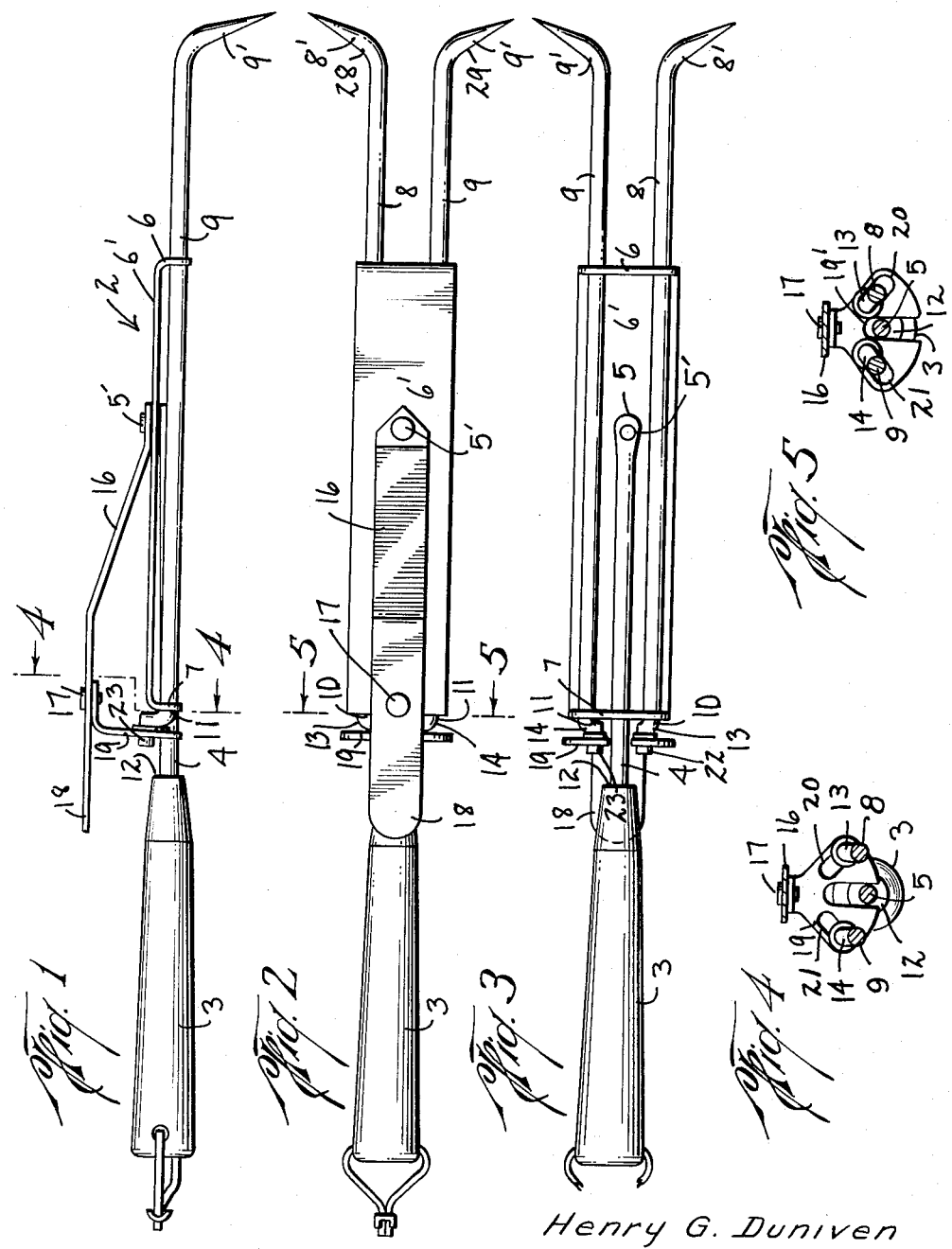
Henry G. Duniven
INVENTOR.
BY Hayden & Pravel
ATTORNEYS March 14, 1961
H. G. DUNIVEN
2,974,993
OBJECT ENGAGING DEVICE
Filed Sept. 27, 1957
2 Sheets-Sheet 2
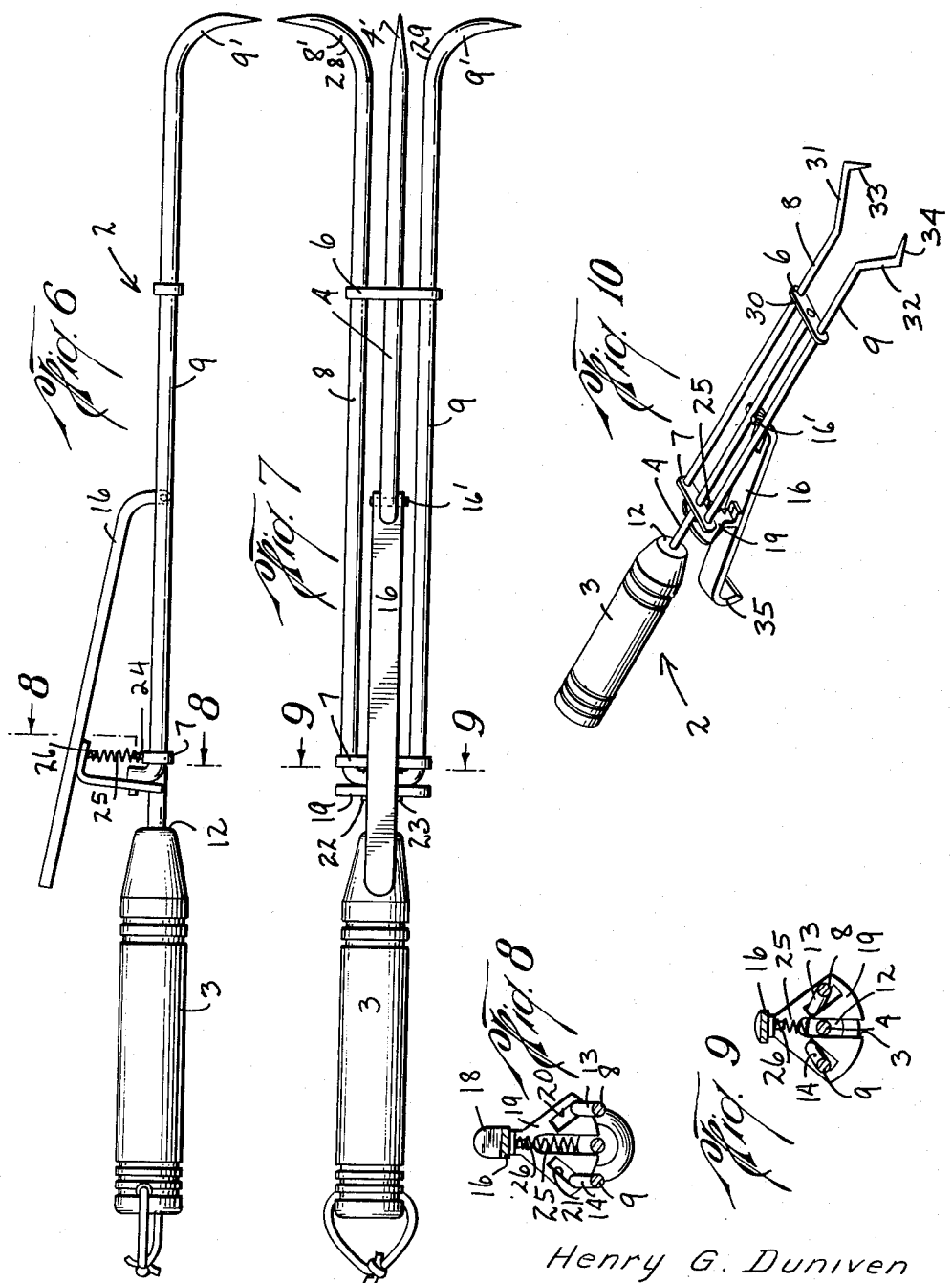
Henry G. Duniven
INVENTOR.
BY Hayden & Prewel
ATTORNEYS United States Patent Office 2,974,993
Patented Mar. 14, 1961

2,974,993
OBJECT ENGAGING DEVICE
Henry G. Duniven, 3703 Glenhaven, Houston, Tex.
Filed Sept. 27, 1957, Ser. No. 686,730
6 Claims. (Cl. 294—61)

The present invention relates to a device for engaging objects. More particularly, the present invention has application as a culinary apparatus which is provided with tines that are adapted to be rotated whereby objects may be engaged by the tines and retained on the apparatus.

This application is a continuation-in-part of my prior copending application Serial No. 611,587, filed on September 24, 1956, now abandoned, and relating to an invention in Culinary Apparatus.

Various forks have been provided with a view of including constructions whereby they may engage and retain objects on the tines thereof. However, all of such devices include complicated, cumbersome mechanism which is difficult to manipulate for actuation to engage an object and difficult to actuate to effect release from the object at a desired time.

The present invention relates to a culinary apparatus such as a fork which is provided with rotatable members or tines so that an object may be engaged on the tines, the tines then rotated so as to aid in retaining the object thereon.

Yet a further object of the invention is to provide a fork having rotatable tines whereby an object may be engaged thereon, and the tines rotated so as to aid in retaining the object engaged thereon.

Still another object of the present invention is to provide a culinary fork having rotatable tines and means whereby the tines may be rotated by the same hand that holds the fork so as to aid in grasping or retaining the object engaged on the ends of the tines.

Other objects and advantages of the present invention will become apparent from a consideration of the following description and drawings wherein:

Fig. 1 is a side view illustrating an embodiment of the present invention with the rotatable tines in non-rotated position;

Fig. 2 is a top plan view on the view of Fig. 1 and showing the rotatable tines in actuated position;

Fig. 3 is a bottom plan view of the device shown in Fig. 1;

Fig. 4 is a sectional view on the line 4—4 of Fig. 1 showing the cranks on the end of the tines and their means of engagement with the lever whereby the tines may be rotated;

Fig. 5 is a sectional view on the line 5—5 of Fig. 2 showing the lever which rotates the tines as having been actuated, and the cooperational relationship of the cranks on the ends of the tines relative to the lever when it has been so actuated;

Fig. 6 is a side view of an alternate embodiment of the invention illustrating tines in a somewhat different arrangement from that shown in Figs. 1–5;

Fig. 7 is a top plan view of the device of Fig. 6;

Fig. 8 is a sectional view on the line 8—8 of Fig. 6 and shows the elements of the Fig. 6 device in a relationship somewhat similar to the relationship of the parts of the Fig. 1 device as shown in Fig. 4;

Fig. 9 is a sectional view on the line 9—9 of Fig. 7 and also shows a relationship similar to that of Fig. 5; and Fig. 10 is a perspective view of an alternate embodiment of the invention showing a different configuration on the ends of the tines.

In Fig. 1 the invention is illustrated generally by the numeral 2, the device being illustrated in the form of a fork for use, by way of example, as a culinary apparatus. A handle 3 is provided whereby the fork may be grasped in the hand of the user, there being a rod or stationary tine 4 extending forwardly from the handle as best illustrated in Figs. 1–3. Tines 8 and 9 are shown on each side of the tine 4, and the tine 4 terminates short of the ends 8' and 9' of tines 8 and 9, as shown at 5 in Fig. 3. The ends 8' and 9' of the tines 8 and 9 extend laterally relative to the longitudinal axis of each of the tines as shown in the drawings.

Suitable support means are provided for the tines 8 and 9, such means being illustrated at 6' in the form of a plate which extends longitudinally of tines 4, 8 and 9. The plate 6' is secured by any suitable means such as brad 5' to the tine 4, as shown in Fig. 3, whereby the support 6' is positioned on the device 2. The support plate 6' has its ends 6 and 7 bent out of the plane of the plate, as more clearly seen in Figs. 1 and 3 of the drawings, and the tines 8 and 9 extend through openings in each of the ends 6 and 7 of the support 6' as shown in Figs. 1 and 3. The plate 6' positions the tines 8 and 9 relative to the tine 4 and the ends 6 and 7 of the plate 6' permit free rotation of the tines 8 and 9 about their longitudinal axis so as to not interfere with the proper functioning and operation of the device as will be more fully described hereinafter.

The ends 10 and 11 of tines 8 and 9 terminate in spaced relation relative to the end 12 of handle 3 and extend forwardly along and in spaced relation to the tine 4 as illustrated in the drawings. The tines 4, 8 and 9 may be of the same length as shown in the modification illustrated in Figs. 6 and 7, or the tine 4 may be shorter as shown in Figs. 1–3. Under some circumstances, it might be desirable to vary the length of tines 4, 8 and 9 other than as illustrated, and it should be obvious that such variation could be accomplished without departing from the scope of the present invention. The ends 10 and 11 of tines 8 and 9 assume the form of cranks 13 and 14 as best seen in Figs. 4 and 5 of the drawings.

A lever 16 is engaged to the plate 6' and tine 4 by means of the brad 5' as shown in Figs. 1 and 2 of the drawings. The lever 16 extends rearwardly toward the handle 3 and terminates as illustrated at 18 relative to the handle 3 and relative to the end 12 of the handle so that the portion 18 of lever 16 may be easily engaged by the thumb of the hand of the user. Suitable means as illustrated at 19, which may be described as bracket means, is secured to lever 16 by brad 17 and depends therefrom. The bracket 19 is provided with slots 20 and 21 which are sloped as illustrated in Figs. 4 and 5 of the drawings and receive the ends 22 and 23 of each of the cranks 13 and 14 respectively, of the tines 8 and 9.

The lever 16 is formed of spring-like material so that it tends to assume the position of Figs. 1 and 4 of the drawings. When the lever 16 is in this position, the ends 8' and 9' which are bent relative to the longitudinal axis of the tines 8 and 9 respectively, will be in a parallel relation. When it is desired to rotate the ends 8' and 9' of the tines 8 and 9, the lever 16 may be depressed toward the handle 3, whereupon the bracket 19 moves downwardly so that the cranks 13 and 14 assume the position as illustrated in Fig. 5 of the drawings in the slots 20 and 21. This, in turn, effects rotation of each tine 8 and 9 so that the laterally extending ends 8′ and 9′ of the tines 8 and 9 spread apart as shown in Figs. 2 and 3. This aids in retaining any object which may be engaged on the tines of the fork in position thereon.

For example, when cooking a roast or other piece of meat, the present invention may be used by impaling the meat on the ends 8′ and 9′ of the tines 8 and 9, whereupon the lever 16 may be depressed so as to rotate the tines 8 and 9 which in turn moves their respective laterally extending ends 8′ and 9′ away from each other. This spreading of the ends 8′ and 9′ of tines 8 and 9 serves to better retain the meat impaled upon the fork so that it may be turned over or moved, as desired.

It will be noted that the bracket means 19 is provided with a recess 19′ for accommodating the rod 4 as the bracket means 19 moves upwardly and downwardly relative thereto in the operation of the invention.

Figs. 6–9 inclusive illustrate a modification of the form of the invention shown in Figs. 1–5. It will be noted that in the modification shown in Figs. 6–9, the tine 4 is illustrated as being substantially the same length as the tines 8 and 9 and is provided with an end 4′ which is bent downwardly as shown in Fig. 7. The plate 6′ has been eliminated in the Figs. 6–9 modification, and in lieu thereof, spaced supports 6 and 7 are used, which supports are provided with openings through which the tines 4, 8 and 9 extend. The supports 6 and 7 of the Figs. 6–9 modification serve the same function as the ends 6 and 7 of the plate 6′ of the Figs. 1–5 modification, in that the supports 6 and 7 aid in retaining the tines 4, 8, and 9 in proper relation, and also accommodate rotation of the tines 8 and 9 in a manner as described with the Figs. 1–5 modification. The lever 16 is illustrated as being pivotally secured to the tine 4 by means of the pin 16′ which extends through the tine 4 and through the end of the lever 16. A projection 24, which extends upwardly from the support 7, is adapted to receive the spring 25 thereon. A projection 26 on the bracket 19 extends downwardly from the bracket and engages in the upper end of the spring 25 to further aid in positioning the spring 25 so that it continually urges the lever 16 to its uppermost position as shown in Fig. 6.

The use of the invention shown in the Figs. 6–9 modification is the same as that described with regard to Figs. 1–5 modification, except that the end 4′ of the tine 4 will also be impaled in the meat or object which is to be engaged. Thereafter, when the lever 16 is depressed the ends 8′ and 9′ of each of the tines 8 and 9 move outwardly as previously described with regard to Figs. 1–5 modification so as to aid in retaining the meat or other object impaled on the device. Since the remainder of the construction of the Figs. 6–9 modification is similar to the construction of the Figs. 1–5 modification, it will be assumed that a detailed description thereof will not be necessary; however, like numerals have been applied to the Figs. 6–9 modification to correspond with similar parts described to the Figs. 1–5 form.

In Fig. 10 a modification of the invention is illustrated wherein it may be desired to provide tines for grasping objects in a slightly different manner. In this form of the invention, the rod 4 terminates in the support 6. The ends of the tines 8 and 9 are each provided with outwardly and downwardly extending portions 31 and 32 respectively which are provided on their end with prongs 33 and 34.

It will be noted that in the Fig. 10 modification the end of the lever 16 is provided with a finger engagement portion as illustrated at 35. This enables the forefinger of the hand of the user to be engaged with the lever 16 so as to rotate the tines 8 and 9, whereupon the portions 31 and 32 and the prongs 33 and 34 move toward each other to grasp an object therebetween. The remaining structural details of the Fig. 10 modification may assume the form of the invention as shown in Figs. 6 and 7.

While it is believed that the operation of the present invention is apparent by reason of the foregoing description, it will be assumed that the modification illustrated in Figs. 1 and 2 is to be used for engaging an object such as a roast or the like for moving it or turning it over. The handle 3 is grasped in one hand with a finger, such as the thumb, engaged on the end 18 of the lever 16. As long as the lever 16 is in the position as illustrated in Fig. 1, that is, in spaced relation relative to the handle 3, the ends 8′ and 9′ of the tines 8 and 9 of the device are in parallel relation so that the fork may be engaged with the meat or other object. After the object has been engaged upon the tines of the fork, the lever 16 may be depressed whereupon the tines 8 and 9 rotate so as to move their respective ends 8′ and 9′ as previously described so that the ends assume the position as shown at 28 and 29 of Fig. 2 of the invention. After the object has been moved to the desired location or position, the lever 16 may be released, whereupon the spring therein moves the lever 16 to its normal position so as to again rotate the tines 8 and 9 to move them to their original position. The fork may then be withdrawn from the object with a minimum of effort. The operation of the Figs. 6–9 modification is the same as that above described; however, the spring 25 urges the lever 16 to its uppermost position in the Figs. 6–9 modification.

In the Fig. 10 modification, the structural arrangement, as previously mentioned, of the components of the invention are substantially the same as that described with regard to Fig. 6 and Fig. 7. However, the rod 4 terminates in the support 6 and the ends of the tines 8 and 9 are of a different configuration for a different purpose. Additionally, the lever 16 is provided with a finger engagement portion 35 so that, if desired, the forefinger of the hand of the user may be engaged therein for activating the tines 8 and 9. Of course, any finger may be used to accomplish the desired results. The lever 16 of the Fig. 10 modification will maintain a spaced relationship relative to the handle 3 as described relative to the Fig. 6 modification, and when depressed the tines 8 and 9 rotate so as to move the portions 31 and 32 as well as the prongs 33 and 34 towards each other to engage an object therebetween. It seems obvious that the form of the invention illustrated in Fig. 10 may be used on any suitable object for grasping it and moving it to a desired location. For example, the invention may be readily used for moving coals, if it is desired to locate them relative to a particular piece of meat while it is cooking. Also, it may be used for engaging smaller pieces of meat and moving them to a desired location or turning them over. Of course, the invention may be put to any use for engaging any suitable object, but is particularly adaptable for use in outdoor cooking.

In some situations the configuration and arrangement of the tines may assume other and additional and different forms from that illustrated in the present drawings, and it seems readily obvious that any suitable configuration and arrangement of the tines may be provided without departing from the scope of the present invention, in that it provides a construction and arrangement for providing a rotatable tine in a culinary apparatus, particularly such as a fork.

It is to be noted that the invention illustrates the ends 8′ and 9′ of the tines 8 and 9 as being bent in the same general direction and sharpened to aid in impaling or engaging objects such as meat or the like. However, it should be understood that under some circumstances, as previously mentioned, the length of the tines can be varied without departing from the scope of the invention and in some situations, it may be more desirable to provide a blunt end on the tines rather than a sharp end or an end of some other configuration. In other circumstances, it may be desirable to have the ends 8′ and 9′ of the tines bent in some manner other than that described with regard to the present invention. It seems obvious that the above changes can be made without departing from the scope of the present invention as described herein.

Also, other structural modifications in the arrangement of the lever 16 and its relationship to tines 8 and 9 may be provided to accomplish the same function. For example, a pinion, or gear may be secured to each tine and a curved gear rack mounted on lever 16 to effect rotation of the tines as described herein. Other functional and structural equivalents could be provided without departing from the scope of the invention.

Broadly the invention relates to a device for easily and quickly engaging objects which is particularly adaptable as a fork.

What is claimed is:

1. A device for engaging objects including a handle, a rod extending longitudinally therefrom, a support extending longitudinally of said rod, tines supported in said support and on each side of said rod, said tines being rotatable relative to said support and having ends spaced from said handle bent to engage objects, and the other end of said tines having cranks thereon, lever means mounted on said support and extending toward said handle, means extending from said lever and engaging said crank ends, said last mentioned means including slots which are inclined relative to each other and in which are engaged said cranks, said slotted means being adapted to turn said cranks on said tines to rotate said tines about their longitudinal axis when said lever is depressed to move said bent ends of said tines relative to each other to engage objects thereon.

2. A device for engaging objects including a handle, a rod extending therefrom, support means carried by said rod, tines extending longitudinally on each side of said rod and carried by said support means for rotation about their longitudinal axis, ends on said tines in spaced relation to said handle, said ends extending laterally relative to the longitudinal axis of said tines, and means connected with said tines for rotating said tines about their longitudinal axis and in opposite directions relative to each other whereby said laterally extending ends are moved relative to each other to aid in retaining an object engaged by said device, said last named means including a lever on said support, a bracket secured thereto and having slots for engaging said tines, said lever movable to slide said slots relative to said tines to rotate said tines whereby an object may be picked up by said tines.

3. A fork for engaging objects comprising a handle, a rod extending therefrom, tines on each side of and rotatably supported by said rod and extending forwardly thereof, the ends of said tines in spaced relation to said handle being bent, and means engaging said tines for rotation thereof about their longitudinal axis in opposite directions whereby objects may be gripped by the ends of said tines, said last named means including a lever, and means operatively connecting said lever with said tines to effect rotation of said tines about their longitudinal axis.

4. The combination recited in claim 3 wherein the other ends of said tines have cranks thereon, and wherein said last named means of claim 3 includes a connection extending from said lever and having slots for engaging said crank ends of said tines, said connection movable to turn said cranks and connected tines when said lever is moved to move said tine ends away from each other to engage an object thereon.

5. A device for engaging and carrying objects comprising a handle, a rod extending longitudinally therefrom, tines on each side of said rod and extending longitudinally of said rod, support means carried by said rod supporting said tines in spaced relation to said rod and supporting said tines for rotation about their longitudinal axis, cranks formed on one end of said tines, and the other end of said tines being bent to engage objects, a lever carried by said rod and movable relative thereto, bracket means secured to said lever and movable therewith, slots in said bracket means extending at an angle relative to each other and in which slot are engaged said cranks on said tines, spring means supported by said rod and abutting said lever to normally hold said bracket means and crank ends engaged in said slots in a predetermined position, said lever being movable against said spring whereby said crank ends are rotated by movement in said slots to in turn impart rotation to said tines about their longitudinal axis in opposite directions to engage an object by said bent ends of tines and retaining thereon when the device is lifted.

6. The combination recited in claim 5 wherein said slots in said bracket means extend at an angle so that said bent ends of said tines spread apart when said lever is actuated.

References Cited in the file of this patent

UNITED STATES PATENTS

| | | |
|---|---|---|
| 99,971 | Taylor et al. | Feb. 15, 1870 |
| 187,363 | Dixon | Feb. 13, 1877 |
| 643,954 | Ernst | Feb. 20, 1900 |
| 758,811 | Ball | May 3, 1904 |
| 824,642 | Gibbs | June 26, 1906 |
| 1,692,077 | Cochran | Nov. 20, 1928 |
| 2,127,947 | Weiss | Aug. 23, 1938 |
| 2,315,143 | Thompson | Mar. 30, 1943 |
| 2,663,543 | Moseley | Dec. 22, 1953 |